(12) United States Patent
White, III

(10) Patent No.: US 12,523,157 B2
(45) Date of Patent: Jan. 13, 2026

(54) CERAMIC VANE RING-STRUT-RING ATTACHMENT CONFIGURATION

(71) Applicant: RAYTHEON TECHNOLOGIES CORPORATION, Farmington, CT (US)

(72) Inventor: Robert A. White, III, Meriden, CT (US)

(73) Assignee: RTX CORPORATION, Farmington, CT (US)

(*) Notice: Subject to any disclaimer, the term of this patent is extended or adjusted under 35 U.S.C. 154(b) by 315 days.

(21) Appl. No.: 17/743,539

(22) Filed: May 13, 2022

(65) Prior Publication Data

US 2023/0366321 A1 Nov. 16, 2023

(51) Int. Cl.
*F01D 9/04* (2006.01)
(52) U.S. Cl.
CPC ............. *F01D 9/042* (2013.01); *F01D 9/041* (2013.01); *F05D 2240/80* (2013.01); *F05D 2260/36* (2013.01); *F05D 2300/6033* (2013.01)
(58) Field of Classification Search
CPC .... F01D 9/042; F01D 25/246; F05D 2240/80; F05D 2300/6033; F05D 2260/36
See application file for complete search history.

(56) References Cited

U.S. PATENT DOCUMENTS

| | | | |
|---|---|---|---|
| 8,770,931 B2 * | 7/2014 | Alvanos | F01D 5/284 29/889.22 |
| 9,103,214 B2 * | 8/2015 | McCaffrey | F01D 9/041 |
| 9,334,743 B2 * | 5/2016 | Alvanos | F01D 5/284 |
| 9,915,154 B2 * | 3/2018 | Berczik | F01D 5/284 |
| 10,370,986 B2 | 8/2019 | Heitman et al. | |
| 10,975,709 B1 | 4/2021 | Woodfield et al. | |
| 11,193,382 B2 | 12/2021 | Quennehen | |

(Continued)

FOREIGN PATENT DOCUMENTS

| | | |
|---|---|---|
| EP | 3800327 | 4/2021 |
| EP | 3816403 | 5/2021 |
| EP | 3892823 | 10/2021 |

OTHER PUBLICATIONS

European Search Report for European Patent Application No. 23173469.0 mailed Oct. 11, 2023.

*Primary Examiner* — Brian P Wolcott
(74) *Attorney, Agent, or Firm* — Carlson, Gaskey & Olds, P.C.

(57) ABSTRACT

A gas turbine engine includes a turbine section that has inner and outer diameter full hoop ceramic support rings that define an annulus there between and ceramic vane arc segments disposed in the annulus. Each segment has radially outer and inner platforms and an airfoil section. The radially outer platform includes an outer platform flange. The radially outer full hoop ceramic support ring axially constrains each of the ceramic vane arc segments via the outer platform flanges, and the radially outer diameter full hoop ceramic support ring radially constrains each of the ceramic vane arc segments at a location adjacent an axially-facing trailing side of the radially outer platform. The radially inner diameter full hoop ceramic support ring radially constrains each of the ceramic vane arc segments at a location adjacent the axially-facing leading side of the radially inner platform.

11 Claims, 5 Drawing Sheets

(56) References Cited

U.S. PATENT DOCUMENTS

| | | | |
|---|---|---|---|
| 11,536,147 B2* | 12/2022 | Sobanski | F01D 5/284 |
| 2016/0084096 A1 | 3/2016 | Carr et al. | |
| 2016/0123164 A1* | 5/2016 | Freeman | F01D 5/284 |
| | | | 415/200 |
| 2016/0201488 A1* | 7/2016 | Carr | F01D 9/041 |
| | | | 29/889.22 |
| 2017/0051619 A1* | 2/2017 | Tuertscher | F01D 9/047 |
| 2021/0231024 A1 | 7/2021 | Whittle et al. | |
| 2023/0193769 A1* | 6/2023 | Whittle | F01D 9/041 |
| | | | 415/200 |

* cited by examiner

CERAMIC VANE RING-STRUT-RING ATTACHMENT CONFIGURATION

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A gas turbine engine according to an example of the present disclosure includes a turbine section disposed about an engine axis. The turbine section has inner and outer diameter full hoop ceramic support rings that define an annulus radially there between and ceramic vane arc segments disposed in the annulus. Each of the ceramic vane arc segments have radially outer and inner platforms and an airfoil section there between. Each of the radially outer and inner platforms includes axially-facing leading and trailing sides, first and second radial sides, and first and second circumferential sides. The radially outer platform includes an outer platform flange extending from the second radial side adjacent the axially-facing leading side. The outer platform flange is elongated in a circumferential direction. The radially outer full hoop ceramic support ring axially constrains each of the ceramic vane arc segments via the outer platform flanges, and the radially outer diameter full hoop ceramic support ring radially constrains each of the ceramic vane arc segments at a location adjacent the axially-facing trailing side of the radially outer platform. The radially inner diameter full hoop ceramic support ring radially constrains each of the ceramic vane arc segments at a location adjacent the axially-facing leading side of the radially inner platform.

In a further embodiment of any of the foregoing embodiments, the radially inner platform includes an inner platform flange that extends from the second radial side adjacent the axially-facing trailing side, and the inner platform flange is elongated in the circumferential direction.

In a further embodiment of any of the foregoing embodiments, the inner platform flange is axially trapped between the radially inner full hoop ceramic support ring and a radially inner static support.

In a further embodiment of any of the foregoing embodiments, the inner platform flange includes a branch that constrains circumferential movement of the radially inner full hoop support ring.

In a further embodiment of any of the foregoing embodiments, the radially outer platform includes a first load pad through which the radially outer diameter full hoop ceramic support ring radially constrains the ceramic vane arc segment, and the radially inner platform includes a second load pad through which the radially inner diameter full hoop ceramic support ring radially constrains the ceramic vane arc segment.

In a further embodiment of any of the foregoing embodiments, the first load pad and the second load pad are circumferentially-elongated bands.

In a further embodiment of any of the foregoing embodiments, the outer platform flange has a branch that interfaces with an adjacent component forward of the ceramic vane arc segment.

A further embodiment of any of the foregoing embodiments includes a radially outer static support that has an anti-rotation tab that constrains circumferential movement of each of the ceramic vane arc segments via the outer platform flanges and of the radially outer full hoop ceramic support ring.

In a further embodiment of any of the foregoing embodiments, the ceramic vane arc segments, the radially outer full hoop support ring, and the radially inner full hop support ring are ceramic matrix composite.

A ceramic vane arc segment according to an example of the present disclosure includes radially outer and inner platforms and an airfoil section that extends there between. Each of the radially outer and inner platforms include axially-facing leading and trailing sides, first and second radial sides, and first and second circumferential sides. The radially outer platform includes a single, exclusive outer platform flange that extends from the second radial side adjacent the axially-facing leading side, the single, exclusive outer platform flange being elongated in a circumferential direction.

In a further embodiment of any of the foregoing embodiments, the single, exclusive outer platform flange includes a branch.

In a further embodiment of any of the foregoing embodiments, the radially outer platform includes a first load pad, the radially inner platform includes a second load pad, and the first load pad and the second load pad are circumferentially-elongated bands.

In a further embodiment of any of the foregoing embodiments, the radially inner platform includes an inner platform flange that extends from the second radial side adjacent the axially-facing trailing side, and the inner platform flange is elongated in the circumferential direction.

In a further embodiment of any of the foregoing embodiments, the ceramic vane arc segment is a ceramic matrix composite.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

In this disclosure, like reference numerals designate like elements where appropriate and reference numerals with the addition of one-hundred or multiples thereof designate modified elements that are understood to incorporate the same features and benefits of the corresponding elements.

DETAILED DESCRIPTION

Figure 1:
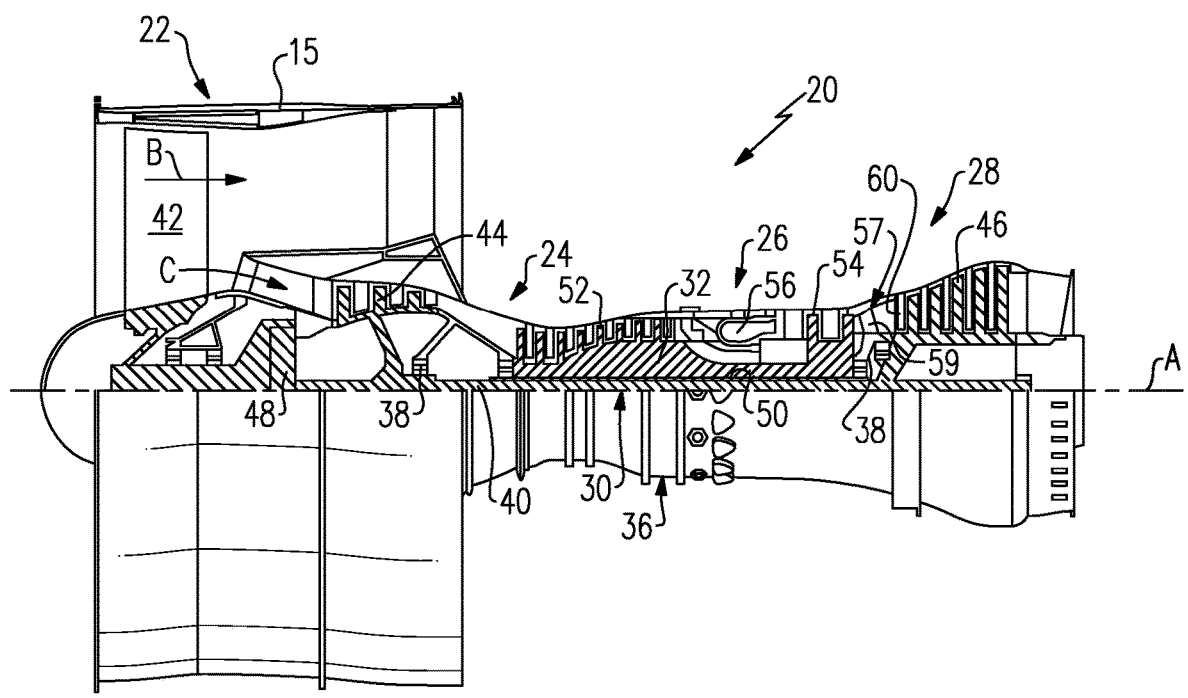
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
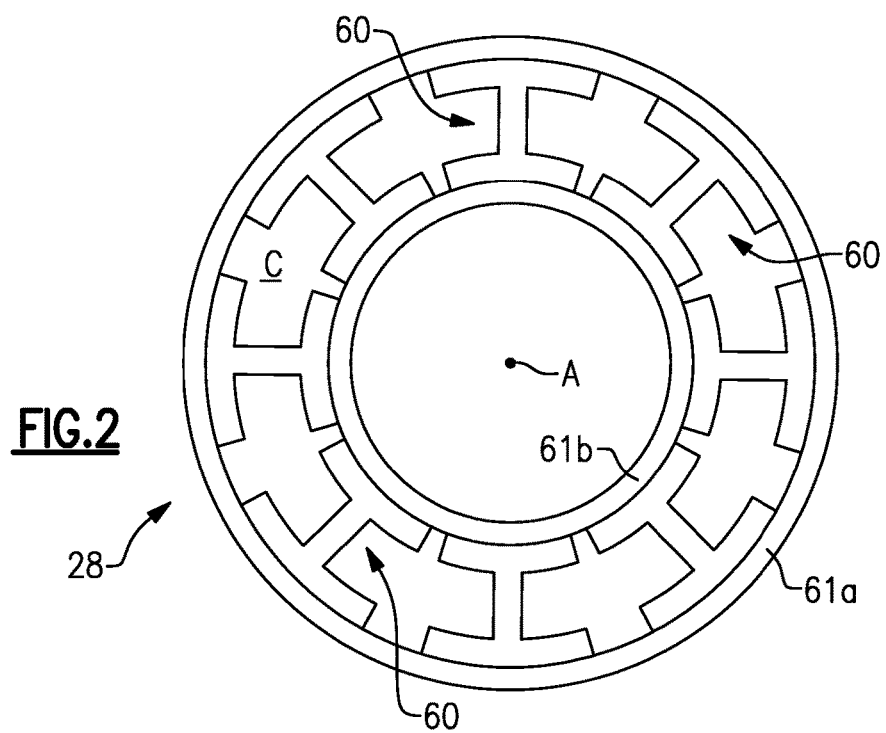
FIG. 2 illustrates an example of a portion of the turbine section of the engine.

FIG. 2 illustrates an example of a portion of the turbine section 28 of the engine 20. The turbine section 28 includes ceramic vane arc segments 60 radially disposed in an annulus defined between outer and inner full hoop ceramic support rings 61a/61b that support the ceramic vane arc segments 60. The full hoop ceramic support rings 61a/61b are continuous rings that have no intersegment gaps or seams (i.e., unsegmented) and few or no through-holes. For instance, the rings 61a/61b and ceramic vane arc segments 60 are arranged as a ring-strut-ring configuration.

Figure 3A:
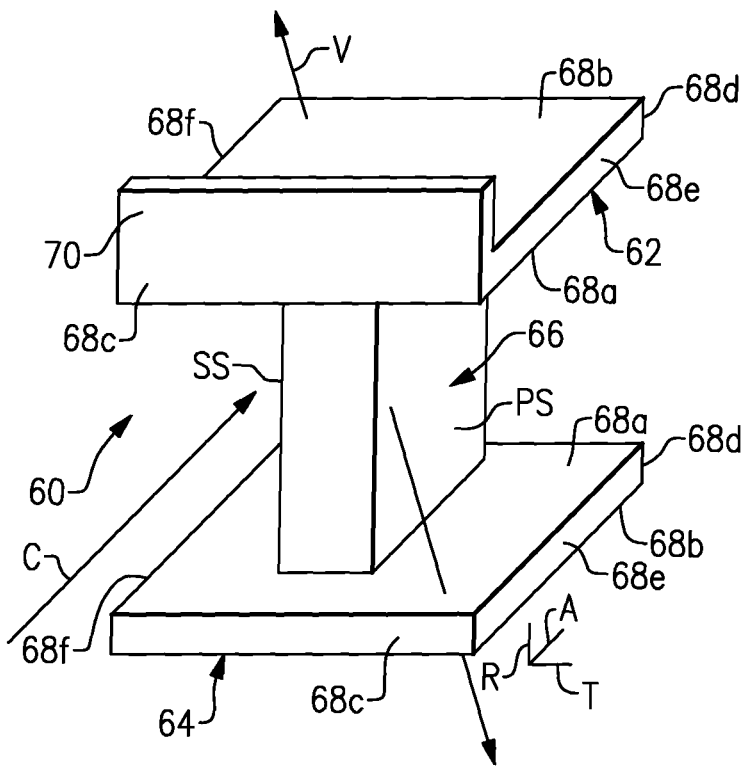
FIGS. 3A and 3B illustrate views of a ceramic vane arc segment from the turbine section.
Figure 3B:
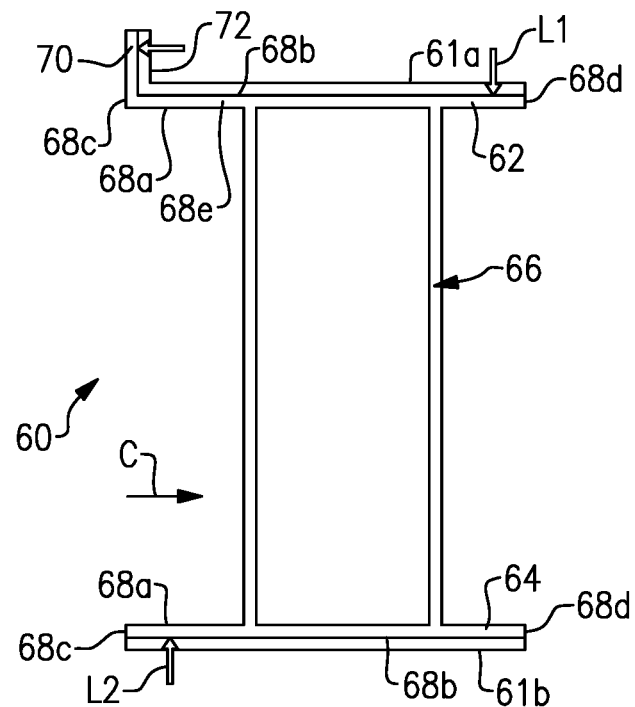

FIG. 3A illustrates a representative one of the ceramic vane arc segments 60, and FIG. 3B illustrates a view of the ceramic vane arc segment 60 in the circumferential direction. The engine central longitudinal axis A, radial direction R, and tangential (circumferential) direction T are superimposed in FIG. 3A to show the relative orientation of the features. Unless otherwise stated, the same relative orientation is carried through the other figures.

Each ceramic vane arc segment 60 is comprised of several sections, including first and second platforms 62/64 and an airfoil section 66 that extends between the platforms 62/64. Although shown generically, the airfoil section 66 generally defines a leading edge, a trailing edge, and pressure and suction sides. The pressure and suction sides are indicated at "PS" and "SS," respectively. In this example, the first platform 62 is a radially outer platform and the second platform 64 is a radially inner platform. Terms such as "inner" and "outer" used herein refer to location with respect to the central engine axis A, i.e., radially inner or radially outer. Moreover, the terminology "first" and "second" used herein is to differentiate that there are two architecturally distinct components or features. It is to be further understood that the terms "first" and "second" are interchangeable in that a first component or feature could alternatively be termed as the second component or feature, and vice versa.

Each of the platforms 62/64 defines a first radial side 68a (core gas path side), an opposed second radial side 68b (non-core gas path side), an axially forward-facing leading side 68c, and axially aft-facing trailing side 68d, as well as circumferential mate faces 68e/68f.

The ceramic vane arc segments 60 and the support rings 61a/61b are formed of ceramic, such as a monolithic ceramic, ceramic matrix composite (CMC), or combinations of CMCs and monolithic ceramics. CMCs are comprised of a ceramic reinforcement, which is usually ceramic fibers, in a ceramic matrix. Example ceramic matrices of the CMC are silicon-containing ceramic, such as but not limited to, a silicon carbide (SiC) matrix or a silicon nitride (Si3N4) matrix. Example ceramic reinforcement of the CMC are silicon-containing ceramic fibers, such as but not limited to, silicon carbide (SiC) fiber or silicon nitride (Si3N4) fibers. The ceramic matrix composite may be, but is not limited to, a SiC/SiC ceramic matrix composite in which SiC fiber tows are disposed within a SiC matrix. The fiber tows are arranged in a fiber architecture, which refers to an ordered arrangement of the tows relative to one another, such as a 2D woven ply or a 3D structure. Example monolithic ceramics may include, but are not limited to, silicon carbide (SiC) and silicon nitride ($Si_3N_4$). The ceramic vane arc segments 60 may be one-piece structures in which at least a portion of the fiber tows and plies are continuous from the first platform 62, through the airfoil section 66, and into the second platform 64.

Structural vane arc segments require axial, radial, and circumferential constraints to inhibit motion when loaded by gas path and/or secondary flow forces. Attachment of ceramic vane arc segments in an engine, however, is challenging. Attachment features, such as hooks, that are typically used for metal alloy vanes can result in inefficient loading if employed in a ceramic vane arc segments, which may be sensitive to stress directionality and distress conditions that differ from those of metal alloy components. Additionally, features such as linear feather-seal slots, variable thickness walls, buttresses, gussets, weldments, complex-geometry investment casting cores, bare machined surfaces, etc. that may be used in metal alloy components are generally not acceptable or attainable in ceramic materials. Stress loading, mechanical and thermal constraints, sealing requirements, and ceramic manufacturing process limitations further complicate attachment designs for ceramic vane arc segments.

To facilitate addressing the considerations above the first platform 62 of the ceramic vane arc segment 60 includes a flange 70 and an attachment scheme with regard to the support rings 61a/61b that provides efficient loading on the ceramic vane arc segment 60. The flange 70 may be a single, exclusive flange of the first platform 62 in that it is the only radial projection of the platform 62 on second radial side 68b (non-core gaspath side). As shown, the flange 70 is a radially upstanding wall that is of substantially uniform radial height and of substantially uniform axial thickness. The flange 70 is located adjacent the axially-facing leading side 68c and is generally elongated in the circumferential direction. For instance, the flange 70 fully spans or substantially fully spans from the circumferential mate face 68e to circumferential mate face 68f. In this example, the flange 70 is flush with the axially-facing leading side 68c, but alternatively may have a relatively small nominal axial offset from the side 68c.

As shown in FIG. 3B, the radially outer full hoop support ring 61a has a flange 72 that interfaces with the flange 70 of the platform 62. The flange 72 of the support ring 61a serves to axially constrain movement of the ceramic vane arc segment 60 and thus react axial loads from the ceramic vane arc segment 60. The support ring 61a also radially constrains the ceramic vane arc segment 60 at a location L1. The location L1 is adjacent the axially-facing trailing side 68d of the radially outer platform 62 and is on the suction side of the platform 62 (i.e., the circumferential portion of the platform 62 adjacent the suction side of the airfoil section 66). It is to be appreciated that the loads referenced herein are aerodynamic loads exerted on the ceramic vane arc segments during operation of the engine 20, such as at cruise conditions.

The support ring 61b also radially constrains the ceramic vane arc segment 60 at a location L2. The location L2 is adjacent the axially-facing leading side 68c of the radially inner platform 64 (i.e., the circumferential portion of the platform 64 adjacent the pressure side of the airfoil section 66). The locations L1/L2 are thus the locations at which radial loads are reacted to the support rings 61a/61b (and ultimately to static structures in the engine 20). The loads above can be estimated using computer-simulated modeling. In that regard, the loads and constraints can thus be considered to be physical attributes of the design, regardless of whether the engine 20 is in operation. It is to be further appreciated that the locations above may be the locations at which the referenced axial and radial loads are primarily concentrated. Minor portions of these loads may be reacted from the ceramic vane arc segment 60 along secondary load paths, which may be minimized during the design phase.

As depicted in FIG. 3A, the loading through locations L1 and L2 provides a "cross-corner" loading scheme. It is "cross-corner" in the sense that the aerodynamic load vector V intersects a leading corner of the platform 64 and a circumferentially opposed trailing corner of the platform 62. The location of the axial constraint at the flange 70 near the axially-facing forward side 68c of the platform 62 thus spatially separates the stress field of the axial stresses from the stress fields of the radial stresses at the locations L1/L2, thereby facilitating reductions in the overall maximum stress state on the ceramic vane arc segment 60. Moreover, such a separation of the stress fields may facilitate reducing deflection of the ceramic vane arc segment 60 and thus limit impingement into the region of an adjacent row of turbine blades.

The aerodynamic load vector V through the ceramic vane arc segment 60 can be defined by the aerodynamics of the engine 20, including the vane count, mass flow rate, and the turning of the hot gas stream. The turning is a function of the inlet flow angle and the stage reaction, and is independent of the vane camber and/or the chord, for example. The direction of the vector V is orthogonal to the tangent of the aerodynamic turning path of the ceramic vane arc segment 60, and is located at a center of pressure on the airfoil section 66. Those of ordinary skill in the art will know where the center of pressure is located and how to determine the load vector V, as they will need to determine it during the design process.

Figure 4:
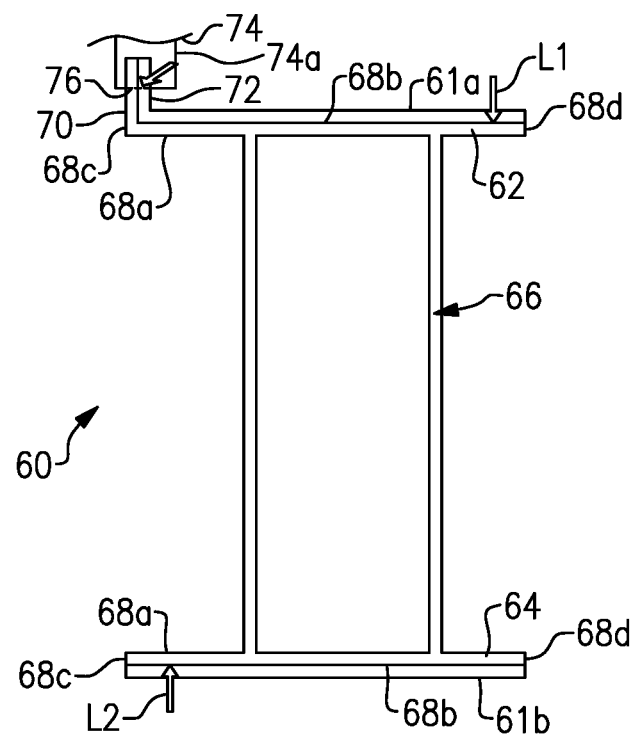
FIG. 4 illustrates an example in which the ceramic vane arc segment is circumferentially constrained.

The ceramic vane arc flange 70 and support rings 61a/61b may include further features in addition to the flange 70 and attachment/load scheme described above in order to constrain the ceramic vane arc segments with respect to other degrees of freedom. For example, as shown in FIG. 4, there is a radially outer static support 74. The static support 74 may be, but is not limited to, an engine case or an intermediate component that is affixed with the engine case or other static structure. The static support 74 includes an anti-rotation tab 74a that extends into a groove 76 formed in the flanges 70/72. Circumferential loads that tend to urge the ceramic vane arc segment 60 and the support ring 61a to rotate circumferentially cause the anti-rotation tab 74a to bear against the sides of the groove 76 and thus constrain circumferential movement of both the ceramic vane arc segment 60 and the support ring 61a.

Figure 5:
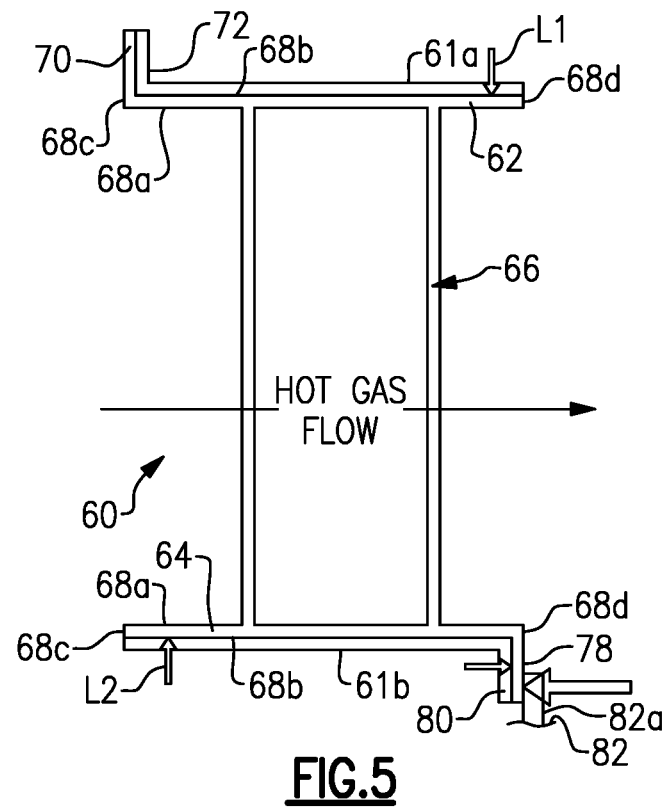
FIG. 5 illustrates an example in which the ceramic vane arc segment is rotationally constrained about the radial direction.

In the example in FIG. 5, the second platform 64 of the ceramic vane arc segment 60 includes a flange 78. The flange 78 may be a single, exclusive flange of the second platform 64. Similar to the flange 70 of the first platform 62, the flange 78 is a radially upstanding wall that is of substantially uniform radial height and of substantially uniform axial thickness. The flange 78 is located adjacent the axially-facing trailing side 68d and is generally elongated in the circumferential direction. For instance, the flange 78 fully spans or substantially fully spans from the circumferential mate face 68e to circumferential mate face 68f. In this example, the flange 78 is flush with the axially-facing trailing side 68d, but alternatively may have a relatively small nominal axial offset from the side 68d.

The support ring 61b also has a flange 80 that interfaces with the flange 78 of the platform 64. There is also a radially inner static support 82. The static support 82 may be, but is not limited to, an inner air seal, a tangential onboard injector structure, radial onboard injector structure, or other static structure. The static support 82 includes a tab 82a that interfaces with flange 78. The flange 78 is axially trapped between the tab 82a and the flange 80 of the support ring 61b.

The configuration of the flange 78, flange 80, and tab 82a serves to rotationally constrain the ceramic vane arc segment 60 about the radial direction (i.e., radial twist). For instance, loads that tend to urge the ceramic vane arc segment 60 to rotate about the radial direction cause the flange 78 to bear against the tab 82a and the flange 80 to thus constrain such twisting movement. The loading is "cross-corner" in that the load is borne in one rotational direction (e.g., counter-clockwise about the radial direction) near the pressure side edge of the tab 82a and in the opposite rotation direction (e.g., clockwise) near the suction side edge of the flange 80. As will be appreciated, a similar configuration could be provided at the flange 70 of the platform 62 and flange 72 of the support ring 61a to rotationally constrain the ceramic vane arc segment 60 about the radial direction.

Figure 6:
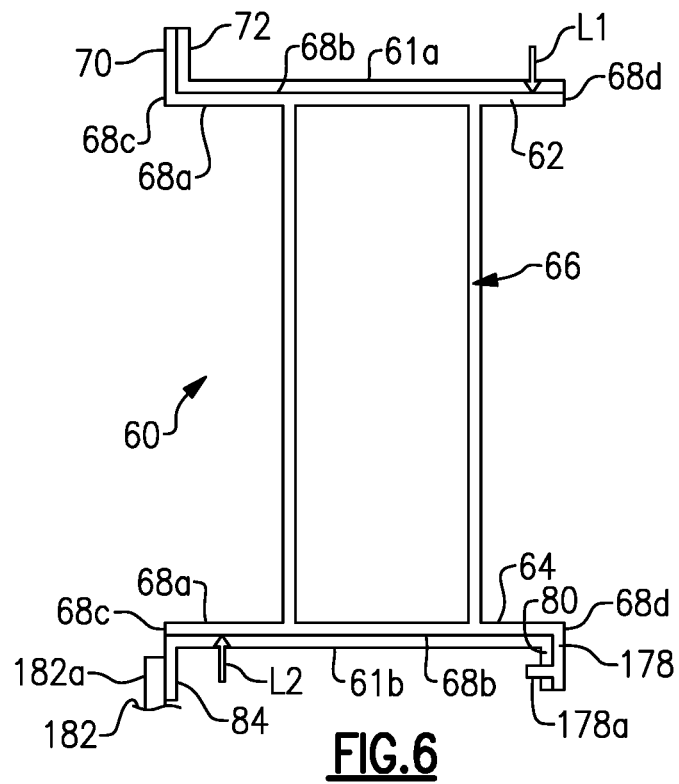
FIG. 6 illustrates an example in which the radially inner full hoop ceramic support ring is axially constrained.

FIG. 6 illustrates a scheme for axially constraining the support ring 61b. As shown, there is a radially inner static support 182 that has a tab 182a. The support ring 61b has a flange 84 that interfaces with the tab 182a. The static support 82 may be, but is not limited to, an inner air seal, a tangential onboard injector structure, radial onboard injector structure, or other static structure. The flange 80 at the trailing side of the support ring 61b interfaces with the flange 178 of the platform 64 such that the support ring 61b is axially constrained between the tab 182a and the flange 178. As also illustrated, the flange 178 may have an axially-extending branch 178a that interfaces with the flange 80 to constrain the support rings 61b about the engine central longitudinal axis A. A similar configuration may be used to axially constrain the support ring 61a, except that the tab 182a may be provided from a static case or an intermediate component that is affixed with the case or other static structure.

Figure 7B:
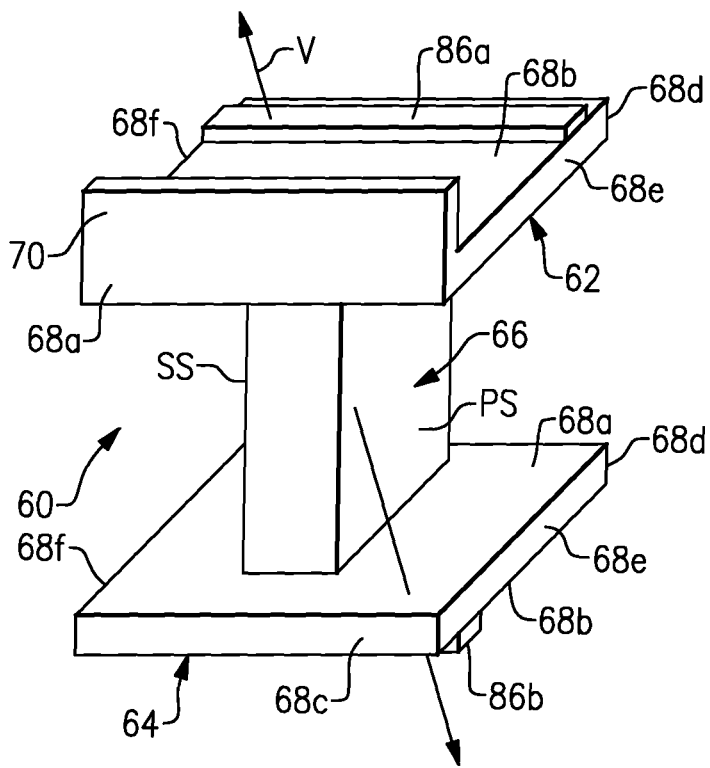
FIGS. 7A and 7B illustrate views of an example in which the ceramic vane arc segment includes load pads.
Figure 7A:
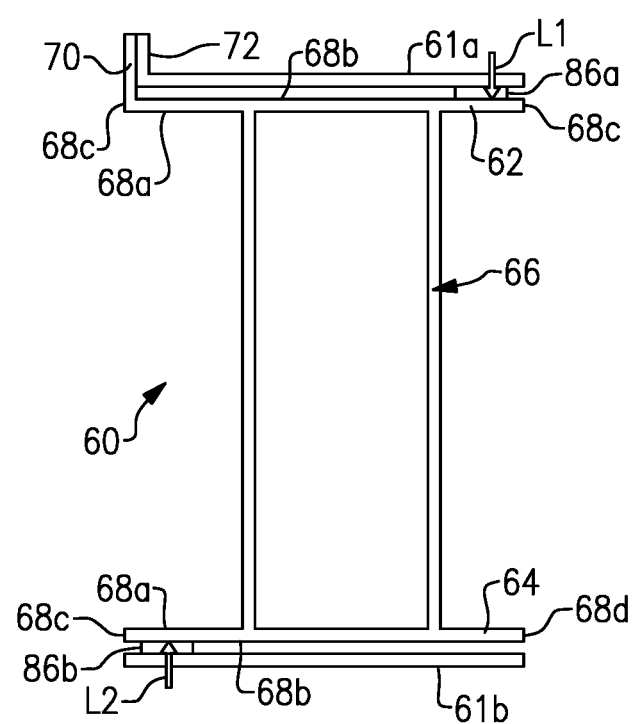

In another example shown in FIGS. 7A and 7B, the platform 62 includes a first load pad 86a and the platform 64 includes a second load pad 86b. The pads 86a/86b facilitate controlling the positioning of the locations L1 and L2 at which the ceramic vane arc segment 60 is radially constrained. For instance, the pads 86a/86b provide the sole radial contact areas from the ceramic vane arc segment 60 to the support rings 61a/61b. In one example, the pads 86a/86b are integral to the respective platforms 62/64. For instance, the pads 86a/86b are formed by a build-up of fiber plies. Additionally or alternatively, the pads 86a/86b could be a build-up of fiber plies on the support rings 61a/61b, or pre-manufactured pieces that are then installed or bonded to either the platforms 62/64 or support rings 61a/61b. The geometry of the pads 86a/86b as far as the radial height and axial width may also be used to facilitate optimization of the loading characteristics.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine comprising:
   a turbine section disposed about an engine axis, the turbine section including
   inner and outer diameter full hoop ceramic support rings that define an annulus radially there between and ceramic vane arc segments disposed in the annulus, each of the ceramic vane arc segments including
   radially outer and inner platforms and an airfoil section there between,
   each of the radially outer and inner platforms including axially-facing leading and trailing sides, first and second radial sides, and first and second circumferential sides, the radially outer platform including an outer platform flange extending from the second radial side adjacent the axially-facing leading side, the outer platform flange being elongated in a circumferential direction, the radially outer full hoop ceramic support ring axially constraining each of the ceramic vane arc segments via the outer platform flanges, and the radially outer diameter full hoop ceramic support ring radially constraining each of the ceramic vane arc segments at a first location adjacent the axially-facing trailing side of the radially outer platform, and the radially inner diameter full hoop ceramic support ring radially constraining each of the ceramic vane arc segments at a second location adjacent the axially-facing leading side of the radially inner platform.

2. The gas turbine engine as recited in claim 1, wherein the radially inner platform includes an inner platform flange that extends from the second radial side adjacent the axially-facing trailing side, and the inner platform flange is elongated in the circumferential direction.

3. The gas turbine engine as recited in claim 2, wherein the inner platform flange is axially trapped between the radially inner full hoop ceramic support ring and a radially inner static support.

4. The gas turbine engine as recited in claim 2, wherein the inner platform flange includes a branch that constrains circumferential movement of the radially inner full hoop support ring.

5. The gas turbine engine as recited in claim 1, wherein the radially outer platform includes a first load pad through which the radially outer diameter full hoop ceramic support ring radially constrains each ceramic vane arc segment, and the radially inner platform includes a second load pad through which the radially inner diameter full hoop ceramic support ring radially constrains each ceramic vane arc segment.

6. The gas turbine engine as recited in claim 5, wherein the first load pad and the second load pad are circumferentially-elongated bands.

7. The gas turbine engine as recited in claim 1, further comprising a radially outer static support that has an anti-rotation tab that constrains circumferential movement of each of the ceramic vane arc segments via the outer platform flanges and of the radially outer full hoop ceramic support ring.

8. The gas turbine engine as recited in claim 1, wherein the ceramic vane arc segments, the radially outer full hoop support ring, and the radially inner full hoop support ring are ceramic matrix composite.

9. The gas turbine engine as recited in claim 1, wherein each of the ceramic vane arc segments is a single piece structure including the outer platform flange and formed of a ceramic matrix composite that has fiber plies that are continuous from the radially outer platform, through the airfoil section, and into the radially inner platform.

10. The gas turbine engine as recited in claim 9, wherein the radially outer platform contacts the radially outer diameter full hoop ceramic support ring at the first location, and the radially inner platform contacts the radially inner diameter full hoop ceramic support ring at the second location.

11. The gas turbine engine as recited in claim 1, wherein the airfoil section has suction and pressure side, and when aerodynamic loads are exerted on the ceramic vane arc segments, the radially outer diameter full hoop ceramic support ring radially constrains each of the ceramic vane arc segments at the first location adjacent the axially-facing trailing side of the radially outer platform on the suction side of the radially outer platform and the radially inner diameter full hoop ceramic support ring radially constrains each of the ceramic vane arc segments at the second location adjacent the axially-facing leading side of the radially inner platform on the pressure side of the radially inner platform.

* * * * *